Aug. 11, 1931.   C. WHITE   1,818,289
GRAVITY DISCHARGING PLATFORM
Filed March 25, 1929
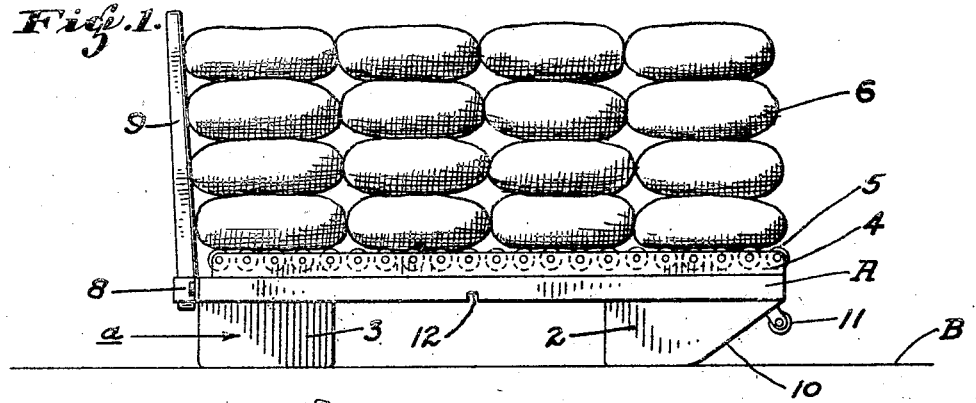
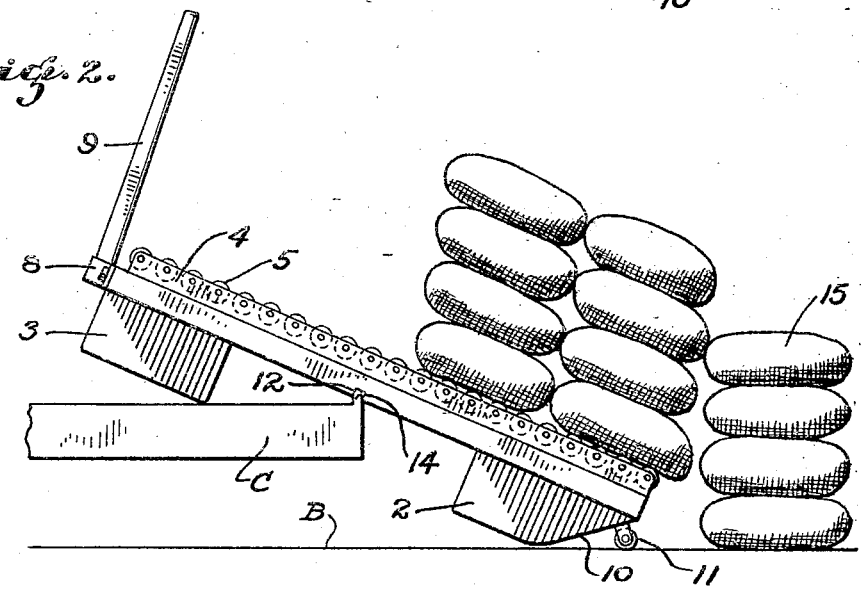
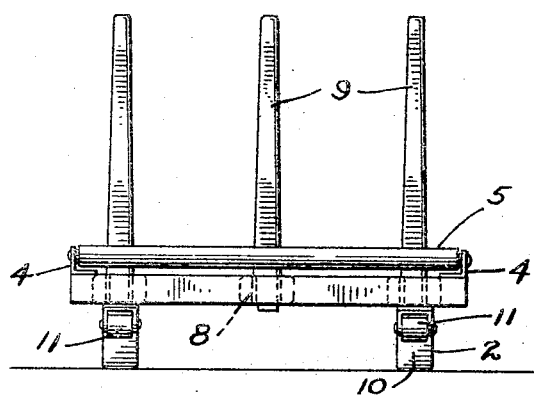
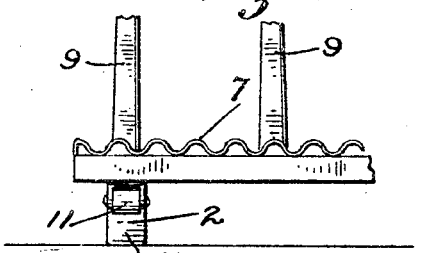
INVENTOR.
Charles White.
BY
Townsend, Loftus & Abbett
ATTORNEYS.

UNITED STATES PATENT OFFICE

CHARLES WHITE, OF SAN FRANCISCO, CALIFORNIA

GRAVITY DISCHARGING PLATFORM

Application filed March 25, 1929. Serial No. 349,561.

This invention relates to a freight receiving platform, intended for use by longshoremen, warehouse workers and the like, for loading, transporting and unloading freight such as sacks, boxes, etc., and especially to a platform from which the freight may be unloaded or discharged by gravity.

The object of the present invention is to generally improve and simplify the construction and operation of freight handling platforms; to provide a platform which may be readily picked up when loaded by a platform carrying truck and transported while loaded to a point where the freight is to be unloaded; and especially to provide means whereby the freight may be unload by gravity action.

The platform is shown by way of illustration in the accompanying drawings, in which:

Fig. 1 is a side elevation of the platform,

Fig. 2 is a side elevation showing the platform in its unloading position,

Fig. 3 is an end view of the platform,

Fig. 4 is a partial end view showing a modified form of the platform.

Referring to the drawings in detail, and particularly to Figs. 1, 2 and 3, A indicates a platform which may be constructed of lumber, or any other suitable material. The platform is supported in an elevated position with relation to a floor surface, such as indicated at B, by means of front and rear supporting legs, generally indicated at 2 and 3, there being two rear legs and two front legs.

Secured to the upper surface of the platform is an anti-friction surface upon which the freight or load is placed. The anti-friction surface may be obtained in a number of ways, two of which are here illustrated.

In Figs. 1, 2 and 3 it will be noted that a pair of side frames, in the shape of angle bars are secured to the upper surface of the platform, as indicated at 4. These angle bars form journal members and supports for a plurality of rollers 5, which are freely journalled therein. The rollers are fairly closely spaced and as such form an anti-friction surface upon which boxes or sacks, such as indicated at 6, or any other suitable freight may be piled.

In Fig. 4 an anti-friction surface is obtained by covering the upper surface of the platform with corrugated iron, such as shown at 7. Both types are in use, and both serve the purpose intended, the only point to be considered being the particular type of freight or material to be handled.

The edge of the platform is provided with a plurality of stake receiving brackets, such as shown at 8 and stakes such as shown at 9 may be inserted therein to support the load and to permit it to be piled as high as desired.

In actual practice the stakes are usually applied to the rear end of the platform only, as this has been found sufficient.

By referring to Figs. 1 and 2 it will be noted that the front supporting legs 2 are inclined, as shown at 10, and that a pair of rollers 11 are secured to the inclined surface, or a point adjacent the same, the function of which will hereinafter be described. It should also be noted that a slot is formed approximately central of the platforms, as shown at 12. The function of this slot will also be described.

In actual operation the freight to be handled is loaded upon the anti-friction surface of the platform, as shown in Fig. 1. A platform handling truck, the forward end of which is indicated at C in Fig. 2 is then run in under the platform, the platform is elevated and the truck together with the loaded platform is then run to the point where the freight is to be unloaded. When this point is reached, as shown in Fig. 2, the platform is again lowered to the floor surface, and the front end of the truck, which is provided with a lug such as shown at 14, is moved into alignment with the central slot 12. The truck is again elevated, and during such elevation the loaded platform is tilted on the forward legs until the rollers 11 engage with the floor surface. In this position the load, whether it be sacks, boxes or otherwise, slides off the anti-friction surface of the platform and if the truck is backed up at the same time, the platform is pulled from under the load and the load is left on the floor surface in a stacked condition as shown at 15, see Fig. 2, hence eliminating the necessity of either unloading or stacking the freight by the usual hand methods.

The front and rear supporting legs, indicated at 2 and 3, might be in the form of a continuous sled runner, but it is preferable to separate the front and rear supports, as shown in Figs. 1 and 2, as the transporting truck can then pick up the platform either crosswise or lengthwise, as the case may be. That is, the load carrying end of the truck, indicated at C, may be run in under the platform from the side thereof, when it will assume a position between the supports 2 and 3. In this position the loading platform is carried crosswise of the load carrying end of the truck.

On the other hand, if the loading end of the truck is run in under the platform in an endwise direction, as indicated by arrow $a$, see Fig. 1, the platform will assume a position longitudinally of the load carrying end of the truck. It is for this reason that the front and rear supports are preferably separated.

The platform here illustrated is loaded in the usual manner, that is, the sacks, boxes, etc., are piled upon the anti-friction surface by hand or otherwise, hence there is nothing new as far as the loading operation is concerned. The big advantage gained is that of unloading, as the entire load may be slid off the platform, and by picking up the platform upon the rollers 11, through means of the truck extension or lug 14, it is also possible to deposit the load on the wharf or warehouse floor in an orderly manner, thus entirely eliminating hand handling while unloading.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. A freight receiving and unloading device comprising a platform provided with an anti-friction surface upon which freight is adapted to be loaded, supports secured to the under side of the platform to maintain the platform elevated with relation to a floor surface, said supports being inclined at one end to permit the platform to be tilted so that the freight will be unloaded by sliding down and off the anti-friction surface of the platform, said platform having a slot formed in its lower surface to provide a shoulder which is adapted to be engaged to permit the platform to be pulled rearwardly while the load is sliding off.

2. A freight receiving platform of the character described having an anti-friction surface adapted to permit the free unloading of freight and supporting members at one end of said platform, said supporting members being disposed so as to support stacked articles at an angle on the platform whereby said articles will be deposited in stacks when they are unloaded by tilting of the platform.

3. A freight supporting platform of the character described having supports thereunder, said supports having inclined ends to facilitate tilting of the platform, an anti-friction surface on the platform to support articles loaded thereon and to permit gravity discharge when the platform is tilted, and stakes at one end of the platform, said stakes being disposed on an angle of more than 90° with relation to the surface of the platform to support articles stacked on the platform at such an angle that the stacks will be substantially vertically disposed when the platform is tilted to discharge position.

CHARLES WHITE.